Patented Mar. 4, 1947

2,417,038

UNITED STATES PATENT OFFICE 2,417,038

FLUORESCENT MATERIAL

Richard H. Clapp, Danvers, Mass., assignor to Sylvania Electric Products Inc., Salem, Mass., a corporation of Massachusetts No Drawing. Application October 25, 1944, Serial No. 560,344

2 Claims. (Cl. 252—301.4)

This invention relates to luminescent materials, and particularly to luminescent materials which emit ultraviolet radiations of erythemal and therapeutic wavelengths.

An object of the invention is to produce a luminescent or fluorescent material which emits radiation in the neighborhood of 3000 Angstrom units in response to excitation by shorter wavelengths, and a further object is to produce such a material with a reasonable life, even in the presence of electrically excited mercury atoms.

A feature of the invention is the use of a fluorescent material containing both calcium phosphate and potassium chloride, with thallium activation. If we take as 100 the radiation in the 3000 Angstrom region of thallium-activated potassium chloride alone, the radiation from thallium-activated calcium phosphate alone in that region will also be found to be 80. But a fired mixture of these two thallium-activated materials forms a fluorescent material with a radiation of 200, or twice as much as can be obtained from either component separately. Moreover, while the potassium chloride material or phosphor turns black and loses its fluorescent power after a few hours' operation on the inside of a fluorescent lamp using an electrical discharge in mercury, my new material has a longer life under such conditions. The potassium chloride phosphor alone is hydroscopic, and difficult to use with ordinary coating processes, but my new material overcomes this difficulty.

In carrying out my invention, I may mix finely powdered tri-calcium phosphate, potassium chloride, and thallium sulphate, ball-milling in acetone to secure intimate contact between the particles. The powdered mixture is then filtered, and dried, after which it is fired for one or two hours at about 900° C. to make the combination fluorescent, and is then re-milled.

Generally about 3% by weight of thallium sulphate is used in the mixture as an activator. The properties of the resultant material change markedly as the proportion of calcium phosphate to potassium chloride is varied. The phosphate without chloride gives a relative radiation value of 80 in the 3000 Angstrom region. This diminishes somewhat as small percentages of potassium chloride are used, and the material loses its fluorescent property altogether where 10% to 15% potassium chloride is used. The ultraviolet emission drops from 80 with no potassium chloride to zero with 10% potassium chloride. With larger proportions of chloride, the ultraviolet fluorescence again returns, reaching a value of 200 with between 25% and 50% chloride. Above 50%, the fluorescence again drops, becoming 100 again when 100% potassium chloride and no calcium phosphate is used.

The material may be used as a coating on the inner surface of the glass wall of fluorescent lamp tubes usual in the art, if desired. The lamp will then emit radiation in the 2900 to 3100 Angstrom unit range, and be effective for tanning and therapeutic purposes.

What I claim is:

1. A luminescent material consisting essentially of a fired mixture of calcium phosphate and potassium chloride, thallium-activated, the potassium chloride being between 25% and 50% of the composition by weight.

2. A luminescent material consisting essentially of a fired mixture of calcium phosphate, potassium chloride and thallium sulphate, the potassium chloride being between 25% and 50% of the composition by weight and the thallium sulphate being about 3% by weight.

RICHARD H. CLAPP.

REFERENCES CITED

The following references are of record in the file of this patent:

UNITED STATES PATENTS

| Number | Name | Date |
|---|---|---|
| 2,179,134 | Servigne | Nov. 7, 1939 |
| 2,226,407 | McKeag | Dec. 24, 1940 |

FOREIGN PATENTS

| Number | Country | Date |
|---|---|---|
| 492,722 | British | Sept. 26, 1938 |
| 492,735 | British | Dec. 19, 1936 |
| 512,154 | British | Aug. 30, 1939 |
| 703,014 | German | Feb. 26, 1941 |